(12) United States Patent
Shimazaki et al.

(10) Patent No.: US 8,286,991 B2
(45) Date of Patent: Oct. 16, 2012

(54) MEMBER FOR RESTRICTING EXPANSION OF CURTAIN AIRBAG AND STRUCTURE OF PORTION WHERE CURTAIN AIRBAG IS MOUNTED

(75) Inventors: Yoshio Shimazaki, Settsu (JP); Tomoki Hashizume, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 150 days.

(21) Appl. No.: 12/744,574

(22) PCT Filed: Dec. 10, 2008

(86) PCT No.: PCT/JP2008/072376
§ 371 (c)(1),
(2), (4) Date: May 25, 2010

(87) PCT Pub. No.: WO2009/078315
PCT Pub. Date: Jun. 25, 2009

(65) Prior Publication Data
US 2011/0115199 A1    May 19, 2011

(30) Foreign Application Priority Data
Dec. 19, 2007   (JP) .................................. 2007-326809

(51) Int. Cl.
*B60R 21/16* (2006.01)
(52) U.S. Cl. .................................. 280/728.2; 280/730.2
(58) Field of Classification Search ............... 280/728.2, 280/730.2, 749
See application file for complete search history.

(56) References Cited

U.S. PATENT DOCUMENTS

| 2001/0040360 A1 | 11/2001 | Ishiyama et al. |
| 2004/0201207 A1 | 10/2004 | Ochiai et al. |
| 2007/0090634 A1 | 4/2007 | Jang et al. |

FOREIGN PATENT DOCUMENTS

| JP | 10 138858 | 5/1998 |
| JP | 2000 33845 | 2/2000 |
| JP | 2000 71928 | 3/2000 |
| JP | 2002 19565 | 1/2002 |
| JP | 2003-212077 | 7/2003 |
| JP | 2003 252161 | 9/2003 |
| JP | 2004 314706 | 11/2004 |
| JP | 2007 106403 | 4/2007 |
| JP | 2007 161169 | 6/2007 |
| WO | 2006 062738 | 6/2006 |

*Primary Examiner* — Eric Culbreth
(74) *Attorney, Agent, or Firm* — Oblon, Spivak, McClelland, Maier & Neustadt, L.L.P.

(57) ABSTRACT

A development restricting member is configured to include a fixing section attachable to a body of a vehicle above the pillar garnish, a holding section opposing to the fixing section, and a middle connecting section connecting a lower end part of the fixing section and a lower end part of the holding section, wherein an upstanding section is provided in a middle part of a base end part and a top end part of the holding section to extend toward the fixing section, so that a folded curtain airbag is housed so as to be surrounded by the fixing section, the holding section, and the upstanding section.

8 Claims, 7 Drawing Sheets

MEMBER FOR RESTRICTING EXPANSION OF CURTAIN AIRBAG AND STRUCTURE OF PORTION WHERE CURTAIN AIRBAG IS MOUNTED

TECHNICAL FIELD

The present invention relates to a technology of restricting a developing operation of a curtain airbag developing in an emergency of a vehicle.

BACKGROUND ART

Conventionally, Patent Document 1 discloses a mounting structure of a curtain airbag device.

The mounting structure of the curtain airbag device disclosed in Patent Document 1 includes a metal plate attached to a body of a vehicle and a guide plate arranged in the metal plate. A sectional shape of the guide plate viewed from the front of the vehicle is a U-shape wrapping around an envelope of a folded curtain airbag with an opening pointed toward outside the vehicle. In an inner wall surface of this guide plate, a plurality of trenches are formed so as to be substantially parallel along a longitudinal direction, and the guide plate is easily bent by these trenches. Then, the guide plate being subjected to a developing force of the curtain airbag is bent at each trench so as to fill a clearance of the metal plate and a garnish.

Patent Document 1: Japanese Patent Application Laid-Open No. 2000-33845

DISCLOSURE OF INVENTION

However, a position that the expanding and developing curtain airbag pushes the guide plate depends on how the curtain airbag is folded, and thus, is not necessarily constant. Therefore, bending parts, deformation speed, and the like of the guide plate are unstable, and developing operations (developing speed, developing direction, developing shape, and the like of the curtain airbag) are also unstable.

It is therefore an object of the present invention to develop and operate a curtain airbag more stably.

In order to solve the above problem, according to a first aspect of the present invention, a development restricting member of a curtain airbag attached along a roof side rail to get across a pillar garnish of a vehicle, includes: a fixing section attachable to a body of a vehicle above the pillar garnish; a holding section opposing to the fixing section; and a middle connecting section connecting one end of the fixing section and one end of the holding section, wherein an upstanding section is provided in a middle part of a base end part and a top end part of the holding section to extend toward the fixing section, so that a folded curtain airbag is housed so as to be surrounded by the fixing section, the holding section, and the upstanding section.

From this, since the upstanding section is provided in the middle part of the base end part and the top end part of the holding section to extend toward the fixing section, when the curtain airbag housed to be surrounded by the fixing section, the holding section, and the upstanding section expands and develops, the curtain airbag will stably push a part of the holding section closer to the top end than the upstanding section. Therefore, the development restricting member is bent relatively stably and the developing operation of the curtain airbag is relatively stabilized.

According to a second aspect of the present invention, in the first aspect of the development restricting member of the curtain airbag, an opening is formed in the holding section such that an upper end part of the pillar garnish is placeable, and the upstanding section is formed at an edge part in the top end side of the holding section of the opening.

Thereby, at the time of expansion and development of the curtain airbag, the development restricting member is bent such that the upper end part of the pillar garnish is placed in the opening of the holding section. At this time, the curtain airbag is suppressed to contact the upper end part of the pillar garnish by the holding member and the upstanding section. As a result the curtain airbag is expanded more reliably and smoothly.

According to a third aspect of the present invention, in the first and second aspects of the development restricting member of the curtain airbag, a weakening portion that is subjected to an expanding and developing force of the curtain airbag to be easily deformed is formed in the middle connecting section.

Thereby, the development restricting member is deformed so as to be stable in the weakening portion, and the developing operation of the curtain airbag is more stabilized.

According to a fourth aspect of the present invention, in the first to third aspects of the development restricting member of the curtain airbag, a part of the holding section closer to the top end part than the upstanding section is at an acute angle to the upstanding section.

Thereby, the force to deform the development restricting member by the expanding and developing force of the curtain airbag is allowed to act on a position closer to the top end of the holding section, so that the deforming operation of the development restricting member and the developing operation of the curtain airbag is more stabilized and expedited.

According to a fifth aspect of the present invention, in the first to fourth aspects of the development restricting member of the curtain airbag, an extending size of the upstanding section is set to be located closer to the inside of the vehicle than the upper end part of the pillar garnish in a state that the holding section is in contact with the pillar garnish by expansion and development of the curtain airbag.

Thereby, even before and after the completion of the expansion and development of the curtain airbag, the curtain airbag more surely avoids to contact the upper end of the pillar garnish, so that the curtain airbag is allowed to develop more smoothly and reliably.

According to a sixth aspect of the present invention, a mounting structure of a curtain airbag for attaching the curtain airbag to a vehicle, includes: a curtain airbag attached along a roof side rail to get across a pillar garnish of a vehicle; an inflator developing the curtain airbag; a development restricting member including a fixing section attachable to a body of a vehicle above the pillar garnish, a holding section opposing to the fixing section, and a middle connecting section connecting one end of the fixing section and one end of the holding section, wherein an upstanding section is provided in a middle part of a base end part and a top end part of the holding section to extend toward the fixing section, so that a folded curtain airbag is housed so as to be surrounded by the fixing section, the holding section, and the upstanding section.

From this, since the upstanding section is provided in the middle part of the base end part and the top end part of the holding section to extend toward the fixing section, when the curtain airbag housed to be surrounded by the fixing section, the holding section, and the upstanding section expands and develops, the curtain airbag will stably push a part of the holding section closer to a top end than the upstanding section. Therefore, the development restricting member is bent relatively stably and the developing operation of the curtain airbag is relatively stabilized.

These and other objects, features, aspects and advantages of the present invention will become more apparent from the following detailed description of the present invention when taken in conjunction with the accompanying drawings.

BEST MODE FOR CARRYING OUT THE INVENTION

Hereinafter, a development restricting member of a curtain airbag according to a preferred embodiment and a mounting structure of the curtain airbag including this will be described.

<1. General Description>

Figure 1:
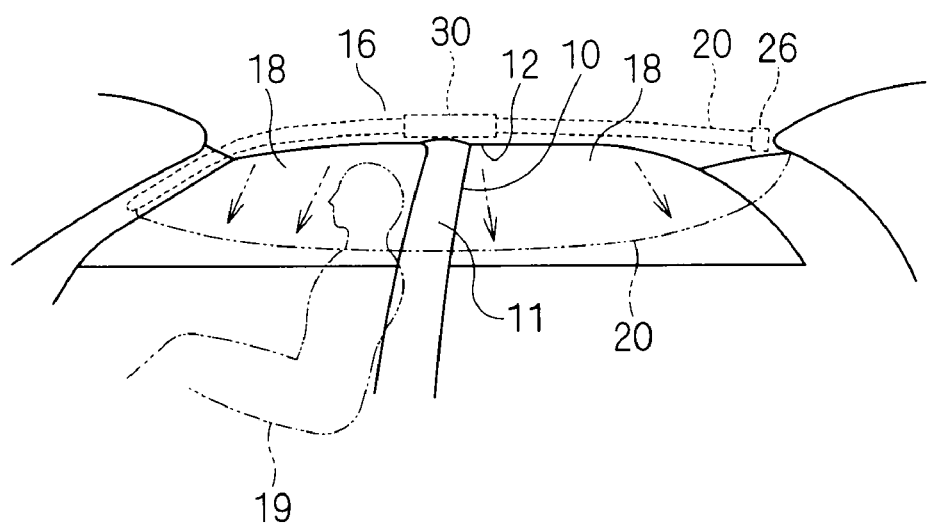
FIG. 1 is a view showing a mounting structure of a curtain airbag assembled in a vehicle.

First, the development restricting member of the curtain airbag and the mounting structure of the curtain airbag including this will be described. FIG. 1 is a view showing the mounting structure of a curtain airbag 20 assembled in a vehicle.

The mounting structure of this curtain airbag 20 is a structure attaching the curtain airbag 20 to the vehicle and restricting the developing operation thereof, including the curtain airbag 20, an inflator 26, and a development restricting member 30.

The curtain airbag 20 is formed to be flat sack-like with cloth and the like, and is configured to develop between a side window 18 of the vehicle and a head of a vehicle passenger 19 in a side collision of the vehicle. This curtain airbag 20 is mounted in the vehicle in the following manner.

Specifically, a roof side rail 12 is provided above a B pillar 10 that is a center pillar of the vehicle along a front and back direction of the vehicle. This roof side rail 12 is mounted to extend so as to surround an upper edge part of the side window 18 and forms a basic frame of a roof periphery of the vehicle. The B pillar 10 is covered with a pillar garnish 11 formed of resin and the like inside the vehicle. This pillar garnish 11 is fixed to the B pillar 10 by a predetermined engagement structure, a screwing structure, and the like. The roof side rail 12 is covered with a roof lining 16 formed of resin and the like inside the vehicle together with a roof of the vehicle and the development restricting member 30 described later.

The curtain airbag 20 is formed to be elongated in accordance with the roof side rail 12 by, for example, rolling and folding. The curtain airbag 20 may be accordion-folded. The curtain airbag 20 folded to be elongated is installed along the roof side rail 12 to get across above the pillar garnish 11 of the vehicle. In this state, the curtain airbag 20 is covered with the roof lining 16 from inside the vehicle. Thus, in a normal state, the curtain airbag 20 is not seen from inside a vehicle interior. The periphery of the roof lining 16 is engaged with an outside part of the vehicle interior of the upper end part of the pillar garnish 11, the roof side rail 12 and the like above the pillar garnish 11, and in the normal state, the periphery of the roof lining 16 is formed not to be curled up toward inside the vehicle interior.

The inflator 26 is configured to receive a detection signal from a collision detection sensor not shown in a collision of the vehicle, particularly in a side collision of the vehicle, and to discharge gas into the curtain airbag 20. Here, the inflator 26 is attached to the curtain airbag 20 at a rear part of the vehicle, discharging gas into the curtain airbag 20 from behind the curtain airbag 20. The position of attaching the inflator 26 is not limited to the present preferred embodiment, but the inflator 26 may be attached in the middle of the longitudinal direction of the curtain airbag 20 or a front part.

Subsequently, the curtain airbag 20 is expanded and developed to be flat sack-like by introducing gas into the curtain airbag 20. The periphery of the roof lining 16 is subjected to this expanding and developing force and elastically deformed to be pushed to inside the vehicle interior, releasing the engagement of the periphery of the roof lining 16 with the upper end part of the pillar garnish 11 and the roof lining and the like. Thereby, the periphery of the roof lining 16 is deformed to be curled up toward inside the vehicle interior, forming a clearance among the periphery of the roof lining 16, the upper end part of the pillar garnish 11, and the roof side rail 12. The curtain airbag 20 is burst out to inside the vehicle interior through the clearance and developed along the side window 18.

<2. Description of Development Restricting Member>

The development restricting member 30 is located near the upper end part of the pillar garnish 11 and restricts the developing operation of the curtain airbag 20 at the time of expansion and development of the curtain airbag 20 so as to prevent the curtain airbag 20 from entering between the pillar garnish 11 and the vehicle body and to allow the curtain airbag 20 developing stably and smoothly.

Figure 2:
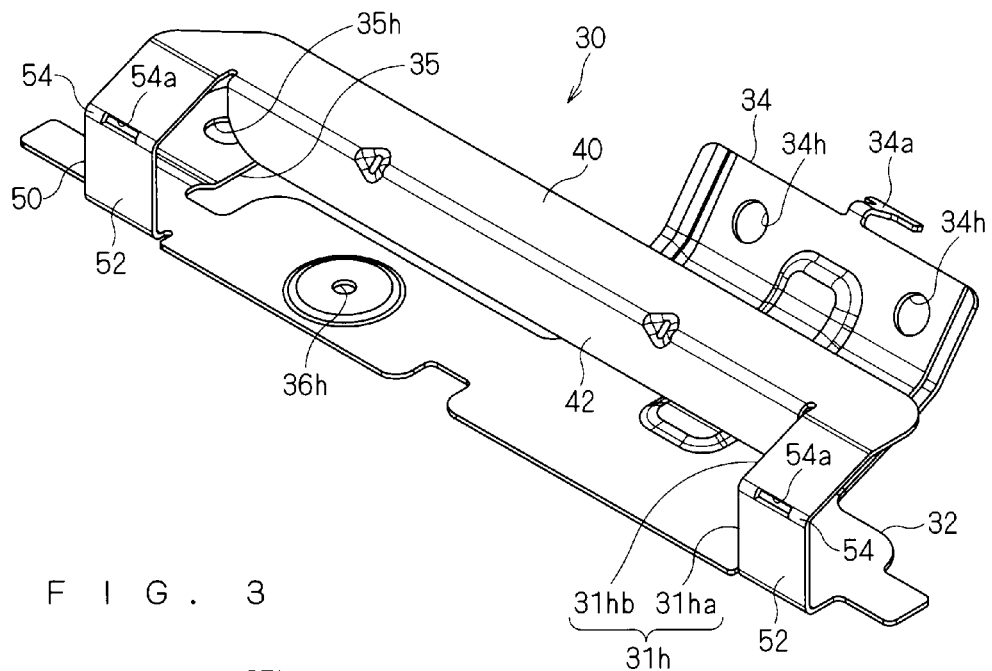
FIG. 2 is a perspective view showing a development restricting member.
Figure 3:
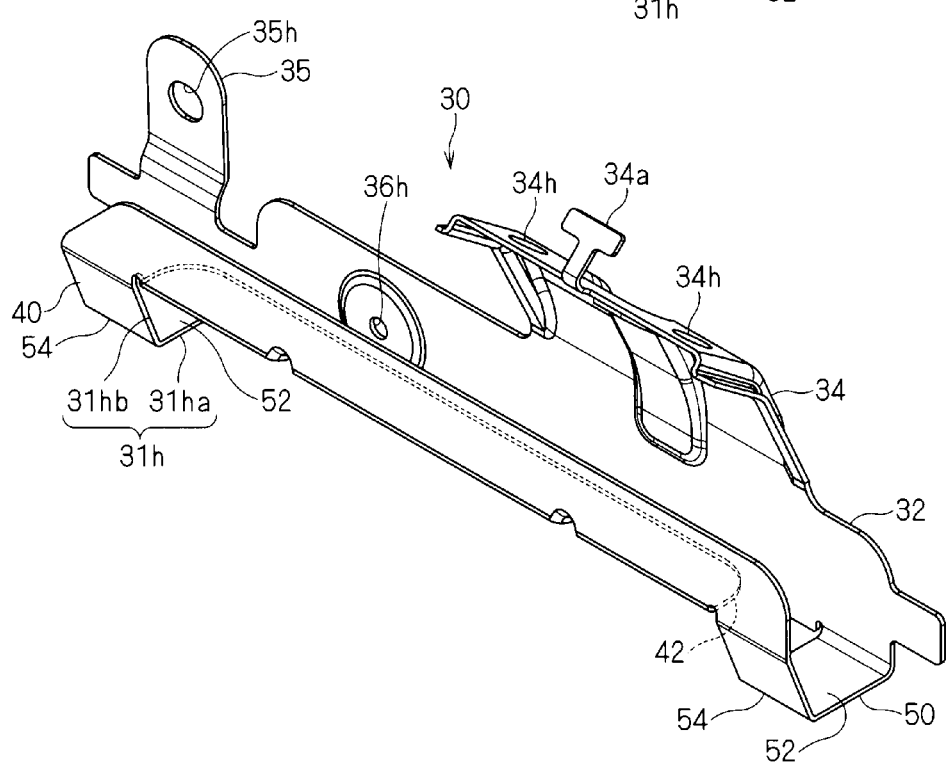
FIG. 3 is another perspective view showing the development restricting member.
Figure 4:
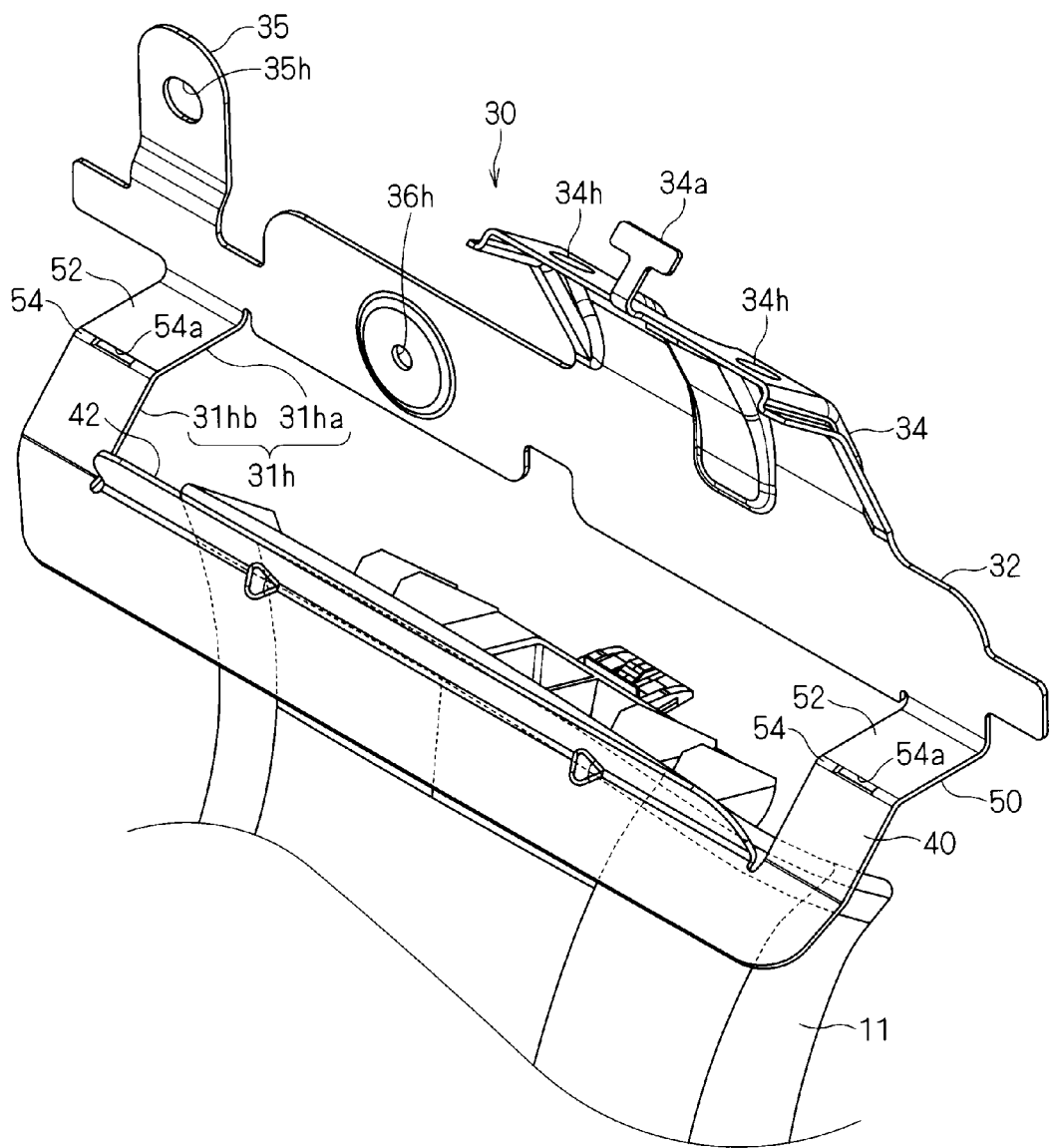
FIG. 4 is a perspective view showing the development restricting member after the curtain airbag is developed.

FIGS. 2 and 3 are perspective views showing the development restricting member 30, and FIG. 4 is a perspective view showing the development restricting member 30 after the curtain airbag 20 is developed.

The development restricting member 30 is formed by punching a metal plate such as an iron plate and processing it to be curved, and includes a fixing section 32, a holding section 40, and a middle connecting section 50 connecting these. The fixing section 32 is a section attached to the vehicle body above the pillar garnish 11. The holding section 40 is mounted to oppose to the fixing section 32 with a space and is a section housing the folded curtain airbag 20 with the fixing section 32. The middle connecting section 50 is a section connecting one end of the fixing section 32 (lower end part in a state of being attached to the vehicle) to one end of the holding section 40 (lower end part in a state of being attached to the vehicle). The holding section 40 and middle connecting section 50 are mounted toward inside the vehicle body against the fixing section 32, and are deformed at the time of development of the curtain airbag 20 to restrict the expansion and development operation of the curtain airbag 20, allowing the curtain airbag 20 to expand and develop stably and smoothly. In the present preferred embodiment, these fixing section 32, the holding section 40, and the middle connecting section 50 are integrally formed.

Specifically, the development restricting member 30 is formed by curving the metal plate that is substantially square-shaped with an opening 31*h* formed in a substantially central part, to be substantially U-shaped in a side view (seen from the front and back direction of the vehicle in a state of being attached to the vehicle), and is configured such that the middle connecting section 50 is provided to extend from one end of the fixing section 32 that is substantially rectangular-plate-shaped (lower side part in a state of being attached to the vehicle) to a direction projecting against the fixing section 32 (direction to the vehicle interior in a state of being attached to the vehicle), and also such that the holding section 40 is provided to extend from the extending end of the middle connecting section 50 (end part inside the vehicle in a state of being attached to the vehicle) to a direction opposing to the fixing section 32 (upper direction in a state of being attached to the vehicle).

The fixing section 32 is formed to be substantially rectangular-plate-shaped, and a first attachment piece 34 is formed at one end of an edge of the top end of the fixing section 32 (upper edge part in a state of being attached to the vehicle). The first attachment piece 34 includes fixing holes 34*h* and a latching piece 34*a* that is substantially T-shaped at a top end part thereof. A second attachment piece 35 that is tongue-shaped is formed at the other end of the edge of the top end of the fixing section 32, and a fixing hole 35*h* is formed in this second attachment piece 35. In a state of latching the latching piece 34*a* to the roof side rail 12 which is a part of the vehicle body above the pillar garnish 11, each of the fixing holes 34*h* and 35*h* is placed so as to overlap with locking holes formed in the roof side rail 12 which is a part of the vehicle body, and bolts are inserted through each of the fixing holes 34*h* and 35*h* and locking holes to screw and tighten nuts. Thereby, the fixing section 32 of the development restricting member 30 is fixed to the roof side rail 12 which is a part of the vehicle body.

A bag fixing hole 36*h* is formed at a middle part of the longitudinal direction of the fixing section 32 for fixing one of side parts of the curtain airbag 20 by bolting. The curtain airbag 20 expands and develops with one of the side parts fixed to the fixed section 32 by bolting and the like using this bag fixing hole 36*h*.

The middle connecting section 50 includes a pair of plate-like middle connecting portions 52 extended from both ends of the longitudinal direction of the fixing section 32, and each plate-like middle connecting portion 52 is provided at substantially right angle to the fixing section 32. An opening 31*ha* is formed between the pair of the plate-like middle connecting portions 52.

In the middle connecting section 50, a weakening portion 54 to be deformed more easily than its surrounding part by being subjected to the expanding and developing force of the curtain airbag 20 is formed. Here, in the middle part of the extending direction of a bend part at a side of the holding section 40 in the pair of plate-like middle connecting portions 52, an elongated linear slit 54*a* extending along the extending direction of the bend part is formed to configure the weakening portion 54.

For the weakening portion, various configurations of forming the weakening portion to be deformed more easily than other parts may be employed such as a configuration of forming a plurality of holes linearly, a configuration of forming the weakening portion thinner than other parts, and a configuration of forming the weakening portion to be deformed more easily than other parts by subjecting it to a physical or chemical action, other than the configuration of forming the slit 54*a* described above. If a part bent at the side of the holding section 40 of the pair of plate-like middle connecting portions 52 is expected to be easily bent, the bent part may be formed as the weakening portion.

The weakening portion may be formed at a position such as a middle part between a connecting part to the fixing section 32 and a connecting part to the holding section 40 in the middle connecting section 50, other than the side part of the middle connecting section 50 described above.

In the present preferred embodiment, the middle connecting section 50 is described as a member extending with a predetermined length, but the middle connecting section 50 may be configured as a bent part connecting the fixing section 32 and the holding section 40 to be substantially V-shaped or substantially L-shaped.

The holding section 40 is formed to be substantially square-plate-like with an opening 31*hb* formed in a substantially middle part of a base end part, and is bent at an obtuse angle in the middle part of its base end part and top end part. The base end part of the holding section 40 is at an obtuse angle to the middle connecting section 50, and the top end part of the holding section 40 is substantially right angle to the middle connecting section 50 and substantially horizontal to the fixing section 32.

The opening 31*hb* formed in the holding section 40 is continuous with the opening 31*ha* formed in the middle connecting section 50 to form one substantially square opening 31*h*. The opening 31*hb* is formed such that an upper end part of the pillar garnish 11 is placeable into it (see FIG. 4). Of course, the opening 31*ha* may be omitted, and the opening 31*hb* may be formed only in the holding section 40.

An upstanding section 42 is provided in the middle part (a part to be bent at an obtuse angle) of the base end part and the top end part of the holding section 40 to extend toward the fixing section 32. This upstanding section 42 is formed at an edge part of the top end of the holding section 40 in the opening 31*hb*. The upstanding section 42 is formed by cutting and raising a part of forming the opening 31*hb* in the holding section 40.

The upstanding section 42 is not necessarily formed by cutting and raising a part of the holding section 40, but another plate-like member formed separately may be fixed by welding or bolting. The position of the upstanding section 42 is not limited to the above, but may be somewhere between the top end part of the holding section 40 and a deformed portion by the expansion and development of the curtain airbag 20 in the development restricting member 30.

Figure 5:
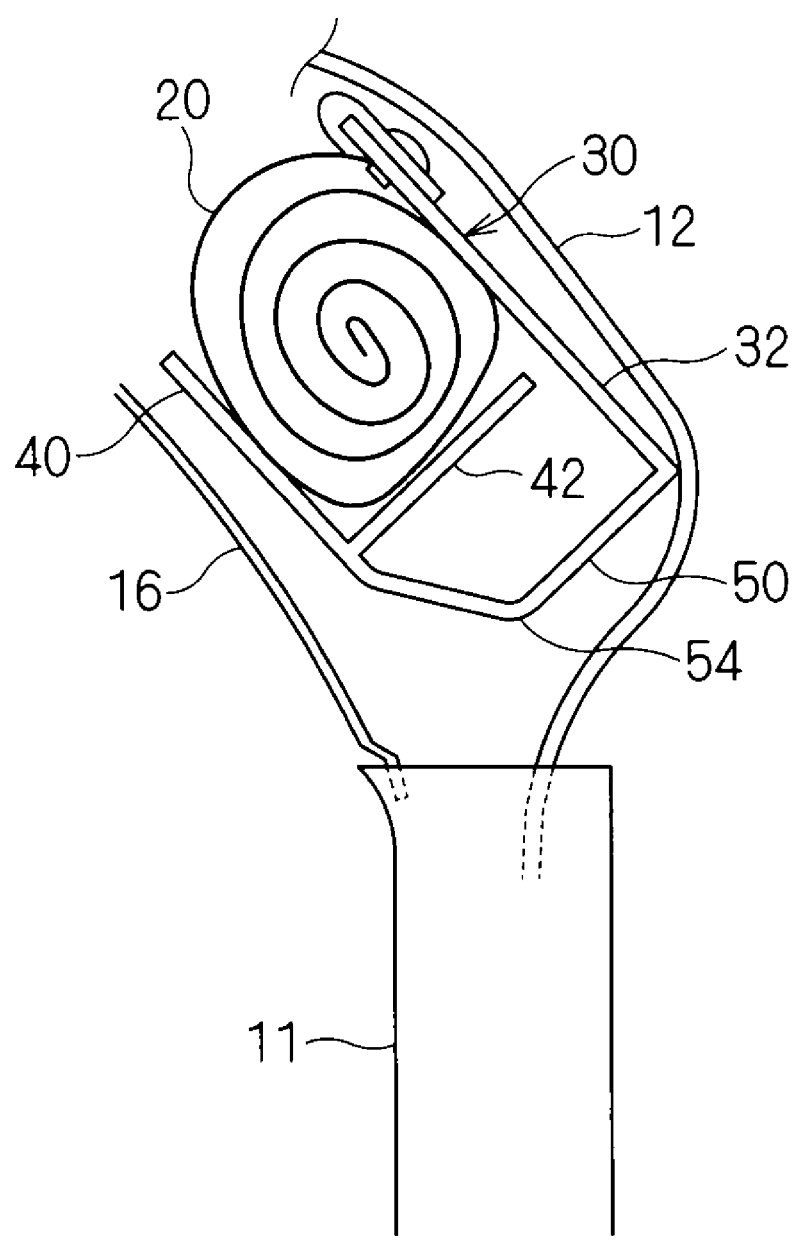
FIG. 5 is a view showing an initial state of the curtain airbag.

Then, the folded curtain airbag 20 is configured to be housed in a space with three sides surrounded by the fixing section 32, the holding section 40, and the upstanding section 42 (see FIG. 5).

The upstanding section 42 is at an acute angle to a part of the holding section 40 closer to the top end than the upstanding section 42 (here, an acute angle is slightly less than a right angle). Thereby, the curtain airbag 20 expanding and developing is to push the holding section 40 and the upstanding section 42 at a part farther than the weakening portion 54 above.

Figure 8:
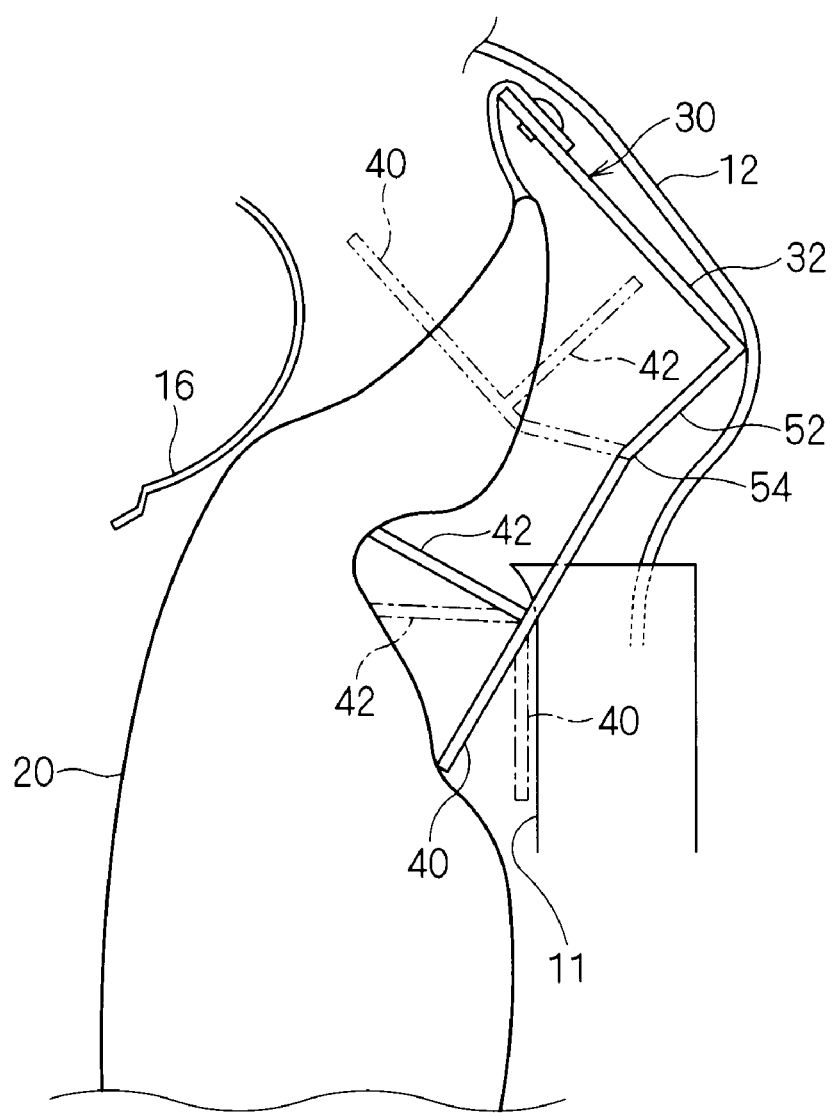
FIG. 8 is a view showing a state of before and after the completion of the developing operation of the curtain airbag.

The extending size of the upstanding section 42 is set at the position such that the top end part of the upstanding portion 42 is located inside the vehicle at the upper end part of the pillar garnish 11 (particularly an edge part of the upper end part inside the vehicle) in a state that the holding section 40 is in contact with the pillar garnish 11 by the expansion and development of the curtain airbag 20 (see FIGS. 4 and 8). This prevents the expanded and developed curtain airbag 20 from contacting the upper end part of the pillar garnish 11.

The folded curtain airbag 20 is housed and supported in the space surrounded by the fixing section 32, the holding section 40 and the upstanding section 42 in a state that the development restricting member 30 is attached and fixed to the roof side rail 12 (see FIG. 5). Thereby, the curtain airbag 20 is supported above the pillar garnish 11. In this state, the development restricting member 30 is housed between the roof side rail 12 and the roof lining 16 together with the curtain airbag 20. Then, the development restricting member 30 and the curtain airbag 20 are covered with the roof lining 16 and are not to be seen in the vehicle interior.

When the development restricting member 30 is formed by punching, it is preferable that a burr on the periphery formed by punching is not in contact with the curtain airbag 20. Here, since the curtain airbag 20 abuts against the holding section 40 and the upstanding section 42 from inside the space surrounded by the holding section 40, the upstanding section 42 and the fixing section 32, it is preferable that punching is performed in a direction from inside the space surrounded by the holding section 40, the upstanding section 42, and the fixing section 32 toward outside the space. Thereby, the burr formed by punching is formed at the edge part outside the development restricting member 30, preferably preventing the burr from contacting the curtain airbag 20.

<3. Description of Operation>

The operation of the development restricting member 30 of the curtain airbag 20 and the mounting structure of the curtain airbag 20 configured above will be described.

Figure 6:
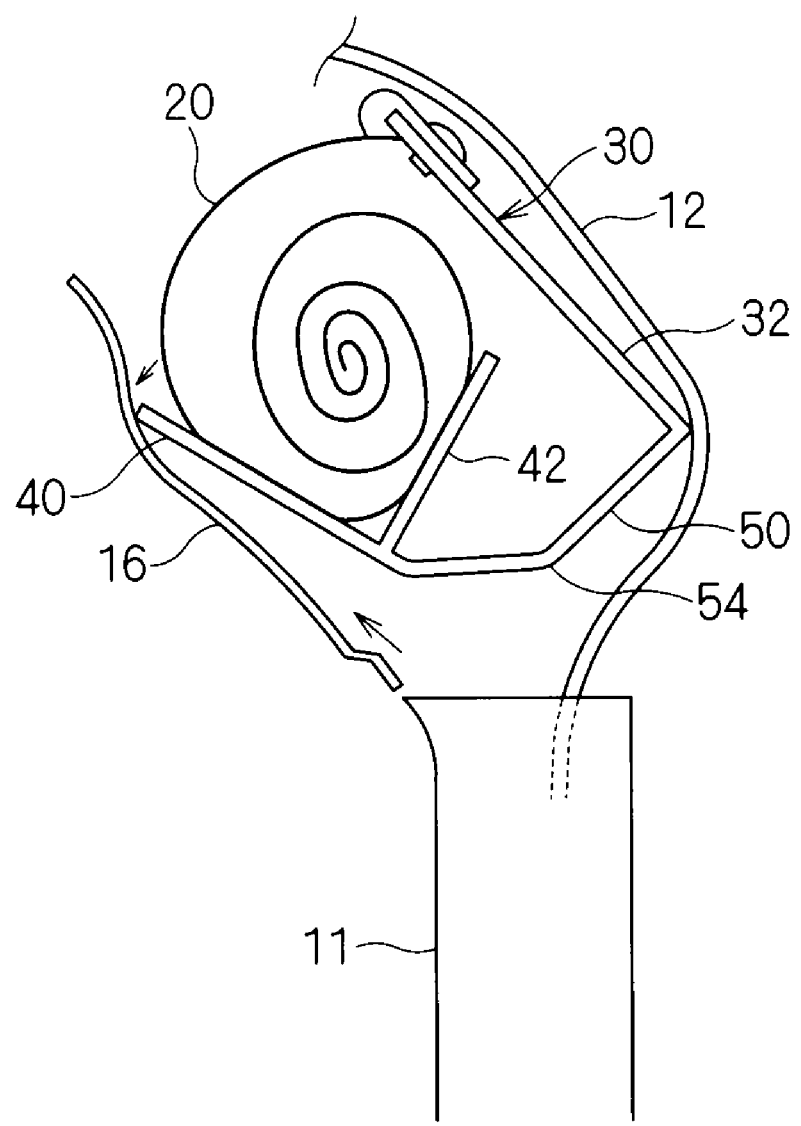
FIG. 6 is a view showing the curtain airbag on the way of developing.
Figure 7:
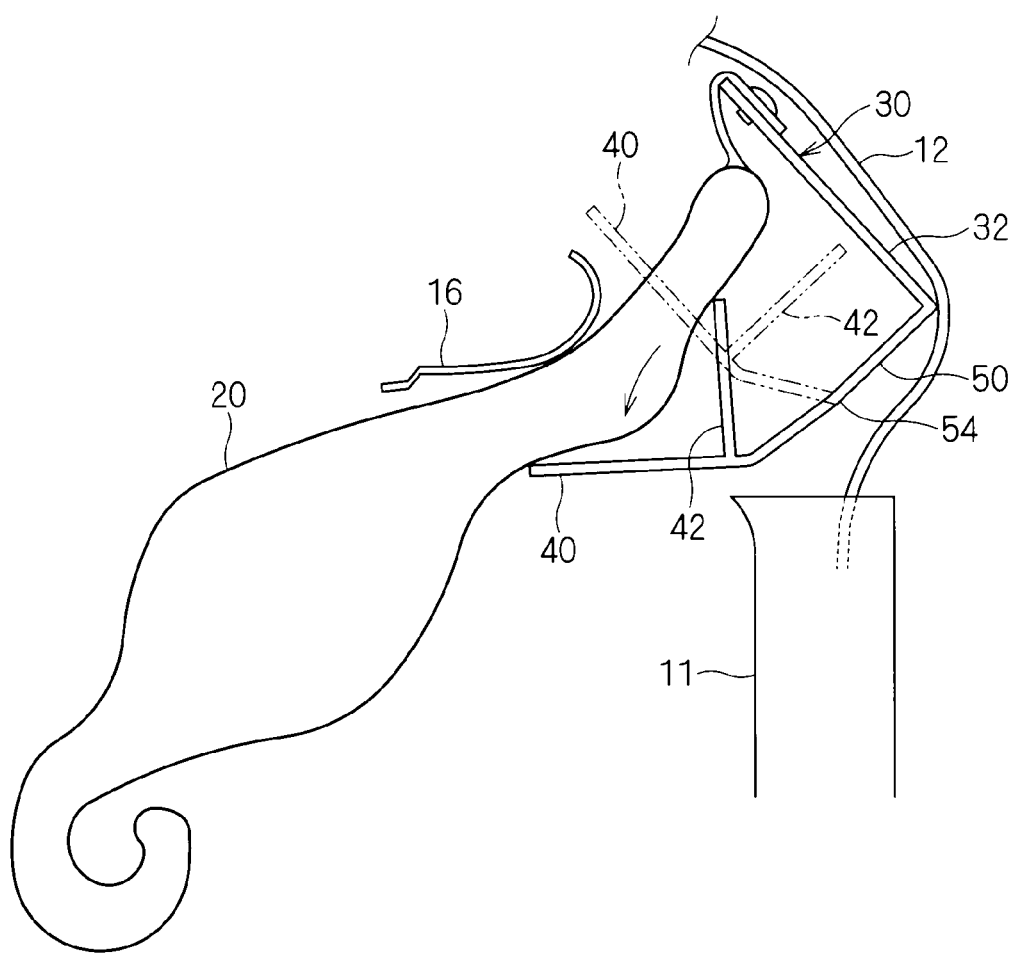
FIG. 7 is another view showing the curtain airbag on the way of developing.

FIG. 5 is a view showing an initial state of the curtain airbag 20, and FIG. 6 and FIG. 7 are views showing the curtain airbag 20 on the way of developing. FIG. 8 is a view showing a state of before and after the completion of the developing operation of the curtain airbag 20.

First, in the initial state, the development restricting member 30 is attached and fixed to the roof side rail 12 which is a vehicle part, above the pillar garnish 11. In this state, the folded curtain airbag 20 is housed and supported in the space surrounded by the fixing section 32, the holding section 40, and the upstanding section 42. That is, the fixing section 32 is attached to the roof side rail 12, the curtain airbag 20 is mounted inside the vehicle interior, and the holding section 40 is mounted further inside the vehicle interior (see FIG. 5).

When the curtain airbag 20 starts to expand and develop by introducing a gas from the inflator 26 in this state, the curtain airbag 20 expands and develops in the space surrounded by the fixing section 32, the holding section 40, and the upstanding section 42. Thereby, the expanding and developing force of the curtain airbag 20 acts on the holding section 42 and the upstanding section 42, and the holding section 40 starts to deform toward inside the vehicle interior by bending at the weakening portion 54. Then, the top end part of the holding section 40 pushes the roof lining 16 toward inside the vehicle interior to release the engagement of the periphery of the roof lining 16 with the upper end part of the pillar garnish 11. Thereby, the periphery of the roof lining 16 is deformable to curl up toward inside the vehicle interior (see FIG. 6).

At the initial stage of the expansion of the curtain airbag 20, the expanding and developing force of the curtain airbag 20 is relatively stable and acts on the part of the holding section 40 closer to the top end than the upstanding section 42 and the upstanding section 42. The development restricting member 30 is pushed at relatively stable position and deformed in this manner so that the development restricting member 30 is deformed in a relatively stable manner regarding the position, deforming speed and the like.

When the curtain airbag 20 further expands and develops, the holding section 40 is further bent at the weakening portion 54 to deform further toward inside the vehicle interior, and a clearance is formed between the upper end part of the pillar garnish 11 and the roof lining 16 deformed to be curled up. The curtain airbag 20 expands and develops through the clearance toward inside the vehicle interior (see FIG. 7).

Further, along with the curtain airbag 20 increasingly expanding and developing, the holding section 40 furthermore deforms so as to gradually bend at the weakening portion 54. A part of the holding section 40 closer to the top end than the opening 31$hb$ gets across the inside of the vehicle interior at an upper end of the pillar garnish 11, and at the same time, the holding section 40 and the middle connecting section 50 deform such that the inside of the vehicle interior at the upper end of the pillar garnish 11 is placed in the opening 31$h$. The curtain airbag 20 expands and develops at an outer side of the holding section 40 and the upstanding section 42 around a bending part that is the weakening portion 54 on the way of developing so far, thereby effectively avoiding contacting the pillar garnish 11.

Finally, the part of the holding section 40 closer to the top end than the opening 31$hb$ abuts against a side of the vehicle interior of the pillar garnish 11 to hold the pillar garnish 11 toward outside the vehicle interior, that is, so as not to be detached (see a dashed line of FIG. 8). Then, the curtain airbag 20 develops to be flat sack-like along the inside of the vehicle interior of the pillar garnish 11 and the roof side rail 12 so as to be interposed between a head of a passenger and the side of the vehicle interior. Even in this final state of developing, the top end of the upstanding section 42 is located inside the vehicle interior at the upper end part of the pillar garnish 11 so that the curtain airbag 20 effectively avoids contacting the upper end part of the pillar garnish 11.

According to the development restricting member 30 of the curtain airbag 20 and the mounting structure of the curtain airbag 20 as configured above, the upstanding section 42 is provided in the middle of the base end part and the top end part of the holding section 40 to extend toward the fixing section 40 so that the curtain airbag 20 stably pushes the part of the holding section 40 closer to the top end than the upstanding section 42. Therefore, the position of the force acting at the time of deformation of the development restricting member 30 is relatively stabilized and the development restricting member 30 deforms in the stable manner regarding the deformation position, the deformation speed and the like. Thus, the curtain airbag 20 expands and develops, being restricted by the development restricting member 30 deformed in the stable manner so as to prevent the interference to the pillar garnish 11, thereby relatively stabilizing the developing operation of the curtain airbag 20.

At the time of expansion and development of the curtain airbag 20, the development restricting member 30 deforms so as to place the upper end part of the pillar garnish 11 in the opening 31$hb$. At this time, the holding section 40 and the upstanding section 42 prevents the curtain airbag 20 from contacting the upper end part of the pillar garnish 11. Thereby, the curtain airbag 20 is allowed to expand more reliably and smoothly.

Further, the upstanding section 42 is formed by cutting and upstanding a part forming the opening 31$hb$ so that the development restricting member 30 including the upstanding section 42 is easily manufactured.

The weakening portion 54 is formed in the middle connecting section 50 so that the development restricting member 30 deforms with the weakening portion 54 as a center at the time of expansion and development of the curtain airbag 20. Accordingly, the development restricting member 30 is allowed to deform at the stable position and the developing operation of the curtain airbag 20 is more stabilized.

The upstanding section 42 is at an acute angle to the part of the holding section 40 closer to the top end than the upstanding section 42 so that the force produced by expansion and development of the curtain airbag 20 acts on the top end part of the holding section 40 and the upstanding section 42 at the position away from the weakening portion 54 to be the center of deformation (center of rotation). Thereby, a relatively large rotation moment is produced to stabilize and expedite the deforming operation of the development restricting member 30, further stabilizing and expediting the expanding and developing operation of the curtain airbag 20.

The angle of the upstanding section 42 to the top end part of the holding section 40 (here, an acute angle) is appropriately determined in accordance with the attachment attitude of the development restricting member 30 to the vehicle, the shape of the development restricting member 30 itself, or the shape of the neighboring pillar garnish 11 and the like. The various settings of angles are easily handled by adjusting the bending angle of the upstanding section 42 to the holding section 40.

The extending size of the upstanding section 42 is set to be located inside the vehicle interior at the upper end part of the pillar garnish 11 in a state that the holding section 40 deforms to contact the pillar garnish 11, so that the upstanding section 42 pushes away the curtain airbag 20 to inside the vehicle interior near the upper end part of the pillar garnish 11 in a state that the curtain airbag 20 has expanded and developed. This prevents the curtain airbag 20 from contacting the upper end part of the pillar garnish 11 more reliably and allows the curtain airbag 20 developing more smoothly and reliably.

{Modifications}

While the preferred embodiment has been described above, the present invention is not restricted to the above preferred embodiment, but various modifications can be devised.

For instance, while the middle connecting section 50 above includes the pair of plate-like middle connecting portions 52, one of them may be omitted.

While the development restricting member 30 itself supports a part of the curtain airbag 20 in the above preferred embodiment, the curtain airbag 20 may be supported by another member.

While the development restricting member 30 is formed of a metal plate as an example in the above present embodiment, the development restricting member 30 may be formed of resin and the like.

While the development restricting member of the curtain airbag and the mounting structure of the curtain airbag has been shown and described above in details, the foregoing description is in all aspects illustrative and not restrictive. It is therefore understood that numerous modifications and variations can be devised without departing from the scope of the invention.

The invention claimed is:

1. A development restricting member of a curtain airbag attached along a roof side rail to get across a pillar garnish of a vehicle, comprising:
a fixing section attachable to a body of the vehicle above the pillar garnish;
a holding section opposing to said fixing section; and
a middle connecting section connecting one end of said fixing section and one end of said holding section,
wherein an upstanding section is provided in a middle part of a base end part and a top end part of said holding section to extend toward said fixing section, so that a folded curtain airbag is housed so as to be surrounded by said fixing section, the top end part of said holding section beyond said upstanding section, and said upstanding section.

2. The development restricting member of the curtain airbag according to claim 1, wherein
an opening is formed in said holding section such that an upper end part of the pillar garnish is placeable in, and
said upstanding section is formed at an edge part in the top end side of said holding section of said opening.

3. The development restricting member of the curtain airbag according to claim 1,
wherein a weakening portion that is subjected to an expanding and developing force of the curtain airbag to be easily deformed is formed in said middle connecting section.

4. The development restricting member of the curtain airbag according to claim 1,
wherein a part of said holding section closer to the top end part than said upstanding section is at an acute angle to said upstanding section.

5. The development restricting member of the curtain airbag according to claim 1,
wherein an extending size of said upstanding section is set to be located closer to the inside of the vehicle than the upper end part of the pillar garnish in a state that said holding section is in contact with the pillar garnish by expansion and development of the curtain airbag.

6. A mounting structure of a curtain airbag for attaching the curtain airbag to a vehicle, comprising:
a curtain airbag attached along a roof side rail to get across a pillar garnish of the vehicle;
an inflator developing said curtain airbag;
a development restricting member including
a fixing section attachable to a body of the vehicle above the pillar garnish,
a holding section opposing to said fixing section, and
a middle connecting section connecting one end of said fixing section and one end of said holding section,
wherein an upstanding section is provided in a middle part of a base end part and a top end part of said holding section to extend toward said fixing section, so that a folded curtain airbag is housed so as to be surrounded by said fixing section, the top end part of said holding section beyond said upstanding section, and said upstanding section.

7. A development restricting member of a curtain airbag attached along a roof side rail to get across a pillar garnish of a vehicle, comprising:
a fixing section attachable to a body of the vehicle above the pillar garnish;
a holding section opposing to said fixing section; and
a middle connecting section connecting one end of said fixing section and one end of said holding section, wherein
an upstanding section is provided in a middle part of a base end part and a top end part of said holding section to extend toward said fixing section, so that a folded curtain airbag is housed so as to be surrounded by said fixing section, said holding section, and said upstanding section,
an opening is formed in said holding section such that an upper end part of the pillar garnish is placeable in, and
said upstanding section is formed at an edge part in the top end side of said holding section of said opening.

8. A development restricting member of a curtain airbag attached along a roof side rail to get across a pillar garnish of a vehicle, comprising:

a fixing section attachable to a body of the vehicle above the pillar garnish;

a holding section opposing to said fixing section; and a middle connecting section connecting one end of said fixing section and one end of said holding section, wherein an upstanding section is provided in a middle part of a base end part and a top end part of said holding section to extend toward said fixing section, so that a folded curtain airbag is housed so as to be surrounded by said fixing section, said holding section, and said upstanding section, and a part of said holding section closer to the top end part than said upstanding section is at an acute angle to said upstanding section.

* * * * *